United States Patent [19]
Borrelli et al.

[11] Patent Number: 4,684,222
[45] Date of Patent: Aug. 4, 1987

[54] SMALL ANAMORPHIC LENSES AND METHOD

[75] Inventors: Nicholas F. Borrelli, Elmira; David L. Morse, Corning, both of N.Y.

[73] Assignee: Corning Glass Works, Corning, N.Y.

[21] Appl. No.: 615,254

[22] Filed: May 30, 1984

[51] Int. Cl.⁴ .............................................. G02B 13/08
[52] U.S. Cl. .................................... 350/420; 350/417
[58] Field of Search ......... 350/417, 420, 421, 432–435

[56] References Cited
U.S. PATENT DOCUMENTS 4,572,611 2/1986 Bellman et al. ................. 350/417 X Primary Examiner—John K. Corbin
Assistant Examiner—Scott J. Sugarman
Attorney, Agent, or Firm—K. van der Sterre

[57] ABSTRACT

Anamorphic lenses or lens arrays are formed in photosensitively crystallizable glass by selective exposure of the glass surface and thermal treatment to cause the crystallization of the glass surrounding the lenses. The lenses, which have elongated cross-sections in the plane of the exposed glass surface and raised curved surfaces resulting from the densification of the surround material, exhibit different surface curvatures over their major and minor transverse axes and thus anamorphic light-focusing properties.

4 Claims, 8 Drawing Figures

SMALL ANAMORPHIC LENSES AND METHOD

BACKGROUND OF THE INVENTION

1. Field of the Invention

The present invention is in the field of optics and relates particularly to small anamorphic lenses useful for special applications such as beam shaping, optical scanning, and optical coupling among small light guides, light sources, and light detectors.

2. Description of the Prior Art

Imaging optical systems wherein the magnification of an image at the image plane differs in two perpendicular directions, typically horizontal and vertical, have been referred to as anamorphic optical systems. One such system, described by I. Powell, *Applied Optics,* 22, (20), pages 3249–3257 (1983), includes prismatic components to expand or compress the field of light traversing the system in one direction. Wide-angle single-component anamorphic lenses have been described by Y. Goncharenko et al., *Sov. J. Opt. Technol.,* 37 (11) pages 725–728 (Nov. 1970), and the design of lenses for shaping laser radiation has been discussed by A. Tsibulya et al., *J. Sov. Opt. Technol.,* 44, (3) pages 140–142 (March 1977).

In addition to utility in photographic and photographic enlargement systems, multicomponent anamorphic lenses have been used in other photographic applications, such as in the reformating of motion picture images for television, as described in U.S. Pat. No. 4,288,818. Applications for single-element anamorphic lenses have included beam shaping for facsimile scanners, as disclosed in U.S. Pat. No. 3,886,309, and beam expanding for scanning optical measurement systems, as disclosed in U.S. Pat. No. 4,074,938.

Anamorphic lenses can be generated by grinding and polishing techniques or by thermoplastic molding processes. The latter, while seemingly more suitable to economical production, do not generally provide surfaces of optical quality, particularly when the molded material is molten glass. Thus a more economical technique for producing non-spherical glass lens material would be desirable.

It is one object of the present invention to provide a novel method for providing small glass anamorphic lenses wherein grinding and polishing of the lenses is not required.

It is a further object of the invention to provide small anamorphic lenses particularly suitable for use with small light emitters and detectors, e.g. semiconductor lasers.

Other objects and advantages of the inventions will become apparent from the following description.

SUMMARY OF THE INVENTION

The present invention provides a glass anamorphic lens by a process of thermal treatment rather than by glass molding or conventional glass grinding and polishing. A glass lens substrate is first selected which consists of a section of a photonucleable thermally crystallizable glass. Such glasses, which are known, exhibit a characteristic such that they can be selectively exposed to light and then heat treated to develop crystallinity in only the exposed sections.

The glass lens substrate thus provided is next selectively exposed to a source of photonucleating light, e.g. ultraviolet or short-wavelength visible light. This exposure is carried out so as to provide an exposed surface region of the substrate which forms a lens surround, i.e. a region surrounding an unexposed area, referred to as the lens region, wherein the lens will ultimately be developed.

To generate the anamorphic lens in the lens substrate, the lens region remaining unexposed during the exposure step must be elongated in the plane of the substrate surface being exposed, i.e., the masked or protected surface region must have an aspect ratio other than unity. Examples of suitable elongated lens surface patterns include rectangular and elliptical patterns.

After the substrate has been exposed in the manner described, it is subjected to a heat treatment which causes the densification of the region of the glass substrate which surrounds the lens region. Densification occurs during heat treatment as a consequence of the development of crystal phases in the exposed surround region which are more dense than the original or parent glass. As a consequence of this process the glass in the lens region is compressed by the surround material and a curved raised surface forms over the lens region which acts as the refractive surface of the lens. Because the lens cross-section is elongated, the curvature of the raised surface is not purely spherical, and thus an anamorphic lens is provided.

An anamorphic lens produced in accordance with the foregoing description can be characterized as an optical device wherein the glass lens is integral with a surround material of differing microstructure (typically crystalline), and the lens including a raised curved refracting surface generated by the densification of the material surrounding the lens. The material surrounding the lens is, however, of a chemical composition identical to that of the lens even though it is of different density.

In a preferred embodiment, the glass forming the lens substrate is formed of a photonucleable glass which is highly opacifiable, i.e., it becomes absorbing after photonucleation and heat treatment. In glass systems of this type the densified surround material forms an optical density mask, preferably opaque, which acts as a stop for the anamorphic lens.

DESCRIPTION OF THE DRAWING

The invention may be further understood by reference to the drawing wherein.

DETAILED DESCRIPTION

Figure 1:
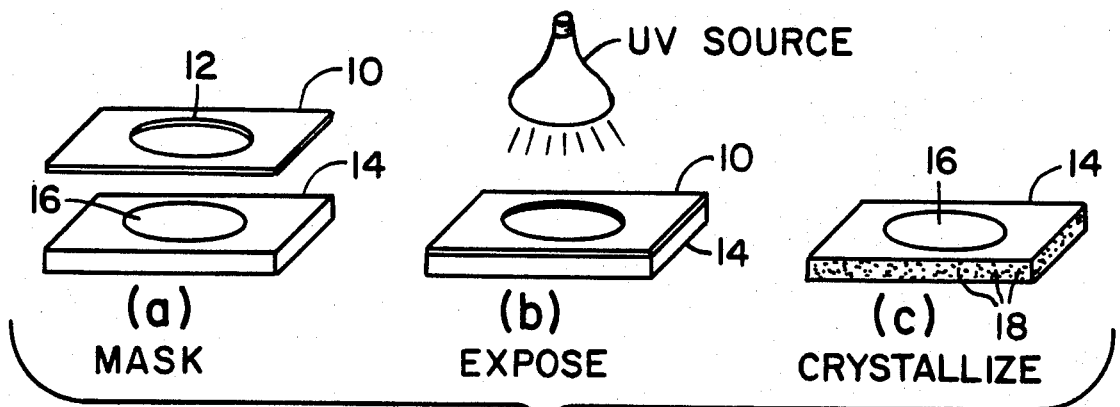
FIG. 1 illustrates the formation of an anamorphic lens according to the invention.

While essentially all inorganic glasses can be devitrified (crystallized) by appropriate thermal treatment, the preferred glasses for use in the present invention are the photonucleable, thermally devitrifiable glasses. These are glasses which can be nucleated in a controlled fashion by an exposure to actinic light (short wave length visible or ultraviolet light), followed by a heat treatment which causes the selective crystallization of the glass in regions previously exposed to actinic light.

Particular examples of glasses such as described are the thermally opacifiable glasses, which are glasses wherein the crystal phases produced by photonucleation and heat treatment are such as to render the glass opaque. Such glasses are well known, and have been described in U.S. Pat. Nos. 2,575,940, 2,515,941, 2,515,943, and 2,628,160. These glasses are silicate glasses in which lithium monosilicate or disilicate, barium disilicate, and/or alkali metal fluoride crystal phases wil develop upon exposure and a suitable subsequent heat treatment. They contain, in addition to alkali metal fluorides, $Li_2O$ and/or $BaO$, and one or more photosensitizing agents selected from the group Au, Ag, Cu, Sb and Ce which play an important role in the process by which crystal nuclei are developed in the glass by exposure and heat treatment.

In the above glasses the development of crystal phases in the glass results in a densification and shrinkage of the crystallizing material due to the higher density of the crystals when compared with the original glass. It is this densification and shrinkage which causes lateral pressure on the unexposed glassy area constituting the lens, compressing the glass and resulting in the desired raised curved surface on the lens. If the uncrystallized region is relatively small, e.g., on the order of 2 mm or less, the raised surface areas can be spherically curved. A copending commonly assigned patent application, Ser. No. 520,456 filed Aug. 4, 1983 by R. H. Bellman et al., describes this effect and its application to the fabrication of spherical microlenses and microlens arrays.

In the present case, the surface relief pattern which must be developed is one which imparts anamorphic focusing characteristics and, for this purpose, a raised surface incorporating at least some cylindrical or cylinder-like curvature must be generated. Such curvature can, in fact, be generated in photonucleable, thermally opacifiable glasses if the lens regions formed by exposure and thermal treatment of the substrate are of elongated cross-section, e.g., not circular in a plane perpendicular to the optical axis of the lens. Examples of elongated lens cross-sections are rectangular and elliptical cross-sections.

Selective exposure of the glass substrate to develop a thermally crystallized, densified surround by for the lens area can most conveniently be accomplished by masking. A mask comprising opaque areas formed of a chromium metal film deposited on a flat glass plate is particularly suitable where accuracy of exposure is desired.

The light source utilized to expose the glass for subsequent nucleation is not critical and can be any collimated source of short wavelength or ultraviolet light. The exposure duration is likewise not critical, depending upon composition and heat treatment variations as described in the aforementioned patents relating to photosensitive glasses. A suitable exposure for a given composition and heat treatment can readily be determined by routine heat treatment.

The heat treatment utilized to crystallize exposed areas of the substrate typically involves two stages: a first stage wherein crystal nuclei are developed upon which subsequent crystallization can readily proceed, and a second or crystallization stage wherein the bulk of crystal growth occurs. In practice, temperatures between the annealing and softening points are utilized for both stages, with nucleation most preferably being promoted by a hold at a temperature in the recited range nearer the annealing point and crystallization by a hold at a somewhat higher temperature nearer the softening point.

While any of the known photonucleable, thermally opacifiable glass compositions of the prior art could be used to generate anamorphic lenses in accordance with the invention, glasses in the lithium silicate system which form lithium silicate phases upon crystallization provide adequate densification and are commercially available. Hence they will be referred to in the following description, and constitute the presently preferred substrate material for use in the invention.

In the case of circular spherical lenses produced in such glasses, lens diameters are typically rather small, due to size constraints imposed by the process through which the lenses are produced. If the masked portion constituting the lens area of the substrate is of overly large diameter, then the central portion of the lens area can assume a flat rather than a curved raised profile, depending upon the dimensions of the lens and other factors such as the orientation of the substrate during heat treatment, the viscosity of the glass, and the degree of densification of the surround material.

In the case of anamorphic lenses, purely cylindrical as well as ellipsoidal lens configurations may be useful, and the former can have one transverse dimension which is very large compared to those typical of spherical lenses. This large dimension is the dimension parallel to the cylinder axis of the lens, corresponding to the major axis of the elongated lens cross section on the exposed substrate surface. The minor axis of such a lens, however, should be relatively short to maintain curvature across the lens surface; minor axis diameters not exceeding two millimeters and preferably not exceeding 500 microns are preferred.

The invention may be further understood by reference to the following illustrative example.

EXAMPLE

A photosensitively crystallizable glass, commercially available as Code 8603 glass from Corning Glass Works, Corning, N.Y., is selected for use as a lens substrate. This glass has the following composition, in parts by weight:

| | |
|---|---|
| $SiO_2$ | 79.1 |
| $Li_2O$ | 9.4 |
| $Na_2O$ | 1.6 |
| $K_2O$ | 4.2 |
| $Al_2O_3$ | 4.2 |
| $ZnO$ | 1.0 |
| $Sb_2O_3$ | 0.4 |
| Au | 0.0012 |
| Ag | 0.115 |
| $CeO_2$ | 0.015 |
| SnO | 0.003 |

A strip of this glass approximately 2"×6" in size is cut from a rolled sheet approximately 1.5 mm in thickness.

One face of this strip is covered with a glass mask which includes, on the face in contact with the strip, an array of elongated opaque dots formed of chromium metal film. The array is 1×6 dots in size, each dot having the configuration of an ellipse approximately 1.2×2.5 millimeters in size.

FIG. 1(a) of the drawing schematically illustrates a section 10 of such a mask which includes a representative opaque dot 12, the mask section overlying and being in proximity to a section 14 of a photosensitive glass strip which includes lens area 16. The mask and strip sections 10 and 12 have been spaced apart to more clearly illustrate the masking effect, although in practice the mask and strip are in close contact for accuracy of exposure.

The strip is next exposed through the mask to radiation from a Hanovia 435 watt mercury arc lamp positioned about 15 inches from the masked glass, for an exposure interval of 100 seconds. This exposure is schematically represented in FIG. 1(b).

After the strip has been exposed to the arc lamp, it is heat-treated at temperatures between the annealing and softening temperature of the glass in accordance with standard photosensitive glass processing practice to crystallize the glass. The strip is first heated to a temperature of approximately 540° C. for approximately 60 minutes to develop nuclei in the glass, and then heated to 580° C. for approximately 60 minutes to develop a lithium silicate crystal phase in the glass. The effect of this heat treatment is schematically shown in FIG. 1(c) wherein crystals 18 have formed throughout strip section 14 except in elongated lens area 16.

Figure 2:
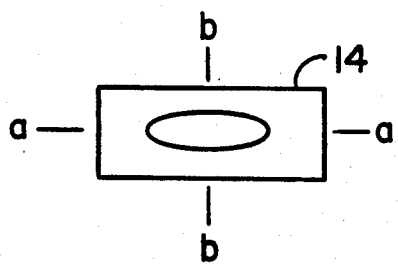
FIGS. 2–2*b* schematically illustrate the form of an anamorphic lens provided according to the invention.
Figure 2A:
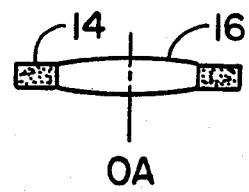
Figure 2B:
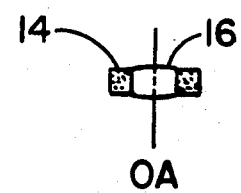

Examination of the strip after heat treatment shows an array of elongated lenses integral with an opaque crystallized surround material, each lens extending through the crystallized strip and incorporating raised curved upper and lower surfaces joining with the surfaces of the crystallized surround material. The configuration of a representative lens is schematically shown, not to scale, in FIGS. 2-2b of the drawing. FIG. 2 is a schematic top view of a section of such a strip after processing, showing the outline of a representative lens 16 in surrounding crystallized glass 14. A cross-section of the lens along line a—a of FIG. 2 is shown in FIG. 2a, a—a representing the major axis of the lens cross-section perpendicular to the optical axis OA of the lens. FIG. 2(b) is a cross section of the lens taken along line b—b (of FIG. 2, that line representing the minor axis of the lens cross-section perpendicular to optical axis OA.

Figure 3A:
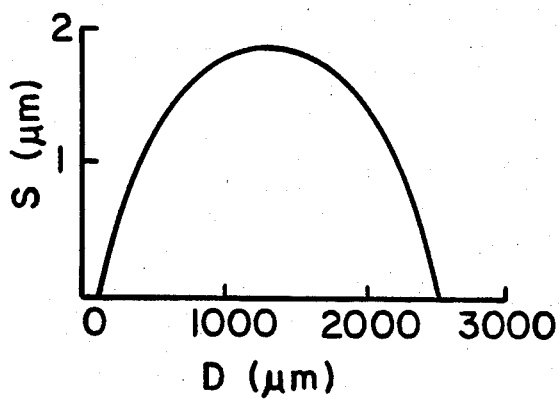
FIGS. 3*a*–3*b* are graphs plotting the elevation across major and minor axes of a curved surface for an anamorphic lens of the invention.
Figure 3B:
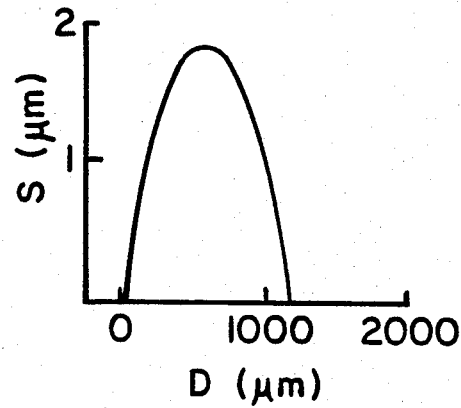

The profile of the raised curved surface of a representative lens in the array approximates an ellipsoidal shape. FIG. 3a of the drawing plots surface height S above the plane of the surface of the crystallized lens surround material as a function of the distance D from one edge of the lens along the major transverse axis of the lens (line a—a in FIG. 2). FIG. 3b is a similar plot of lens height S across the lens surface along the minor transverse axis of the lens (line b—b in FIG. 2). These figures clearly show the differing radii of curvature across the lens surface in orthogonal directions from the optical axis, which give rise to the anamorphic focusing characteristics of the lens.

Figure 4:
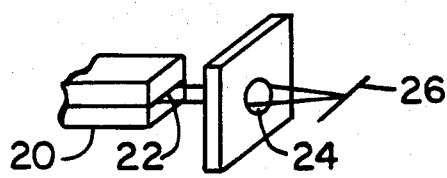
FIGS. 4 and 5 illustrate, respectively, the shaping of a laser diode output beam by a spherical lens, and by an anamorphic lens provided according to the invention.
Figure 5:
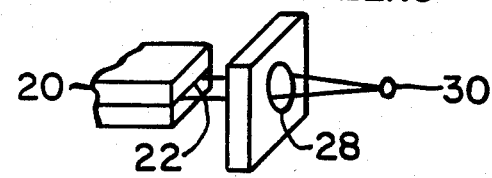

FIGS. 4 and 5 of the drawing compare the focusing characteristics of spherical and anamorphic microlenses in a case where the shaping of a light beam produced by a small semiconductor laser is desired. In FIG. 4, the output from laser 20, which is preferentially directed in a horizontal plane extending from junction 22 of the laser, is focused by spherical lens 24 to an image at 26 which is a line image of the junction. In FIG. 5, the output from a similar junction laser 20 is focused by anamorphic lens 28 to a more nearly circular spot 30. This circularization of the light output from a junction laser is an advantage where the output of the laser has to be optically processed for input to a non-planar device, such as the small cylindrical core of an optical fiber.

Whereas FIG. 5 illustrates the case of full collimation by anamorphic lens, the output of a typical, commercial laser diode is generally not fully collimated with only two refracting surfaces having curvatures such as previously described herein. To obtain full collimation, lens stacking as described in the aforementioned Bellman et al. application, wherein several lenses are axially aligned in a multi-element system, can be used.

We claim:

1. A monolithic optical element comprising at least one light transmitting glass anamorphic lens bounded by a curved light-refracting surface, and material surrounding the lens which is of the same chemical composition but of higher density than the glass comprising the light-transmitting lens.

2. An optical device incorporating at least one glass anamorphic lens surrounded by and integral with a material of differing microstructure, the lens being formed by a raised curved surface generated by the densification of the material surrounding the lens.

3. An optical device in accordance with claim 2 wherein the lens is composed of a photosensitively crystallizable glass and the material surrounding the lens has been densified by photonucleation and thermal opacification.

4. An optical device in accordance with claim 2 which comprises an array of glass anamorphic lenses.

* * * * *